United States Patent

Maietta

[11] 4,060,056
[45] Nov. 29, 1977

[54] ANIMAL HARNESS

[76] Inventor: Josephine Maietta, 85-40 111 st St., Richmond Hill, N.Y. 11418

[21] Appl. No.: 717,245

[22] Filed: Aug. 24, 1976

[51] Int. Cl.² ............................................. A01K 27/00
[52] U.S. Cl. ...................................... 119/96; 119/109
[58] Field of Search ........................... 119/96, 106, 109

[56] References Cited

U.S. PATENT DOCUMENTS

| 1,509,781 | 9/1924 | Roth | 119/109 |
| 3,310,034 | 3/1967 | Dishart | 119/106 X |
| 3,776,197 | 12/1973 | Hughes | 119/96 |

FOREIGN PATENT DOCUMENTS

| 490,219 | 1/1930 | Germany | 119/106 |
| 521,358 | 5/1940 | United Kingdom | 119/96 |

Primary Examiner—Hugh R. Chamblee
Attorney, Agent, or Firm—Robert D. Farkas

[57] ABSTRACT

This disclosure pertains to a harness for animals, such as dogs, utilizing unitary leash grasping means secured to a portion of a harness, grasping the chest of the animal. A neck encircling portion is removably secured about the neck of the animal, supporting the chest grasping portion of the leash. A waist encircling band is secured along the length of the leash and is adapted with a buckle at the uppermost regions thereof. The animal may be restrained by forces exerted on the chest as opposed to windpipe choking forces when the leash is maintained in a staionary position.

5 Claims, 2 Drawing Figures

ANIMAL HARNESS

BACKGROUND OF THE INVENTION

1. THE FIELD OF THE INVENTION

This invention relates to animal harnesses and more particularly to that class utilizing a leash as a unitary portion thereof.

2. DESCRIPTION OF THE PRIOR ART

The prior art abounds with animal harnesses having diverse configurations. U.S. Pat. No. 1,508,601 issued on Sept. 16, 1924 to G. Huff teaches a pair of circular bands adapted to be fastened about the waist and neck of the animal, and interconnected by restraining elements running along the back of the animal and running along the chest of the animal, between the four legs thereof. A leash is affixed to the neck band or collar.

U.S. Pat. No. 2,026,383 issued on Dec. 31, 1935 to J. Gyulay discloses a dog harness comprising a waist encircling cinch-like band having a loop extending horizontally forward therefrom, used to engage the lowermost regions of the dog's neck. An inverted loop is affixed at the free ends thereof intermediate the length of the horizontal loop and is supported at the nape of the neck. A restraining element connects to the uppermost regions of the inverted loop and the uppermost regions of the waist encircling band, at which point a hasp is attached for use in connecting up to a removable leash.

U.S. Pat. No. 3,310,034 issued on Mar. 21, 1967 to H. S. Dishart teaches a safety harness and collar for use by a domesticated animal, such as a dog, in being strapped into a motor vehicle in similar fashion to that of a human utilizing a seat belt. The apparatus comprises a waist encircling band and a neck encircling band coupled together with a restraining element designed to run along the back of the dog. The seat belt apparatus includes, in conventional fashion, a pair of flexible bands extending outwardly from the intersection of the seat and back rest portion of the motor vehicle. The free ends of the bands pass through a pair of enclosed rings, affixed to the uppermost part of the waist encircling cinch strap and to a pair of closed rings affixed at the sides of the neck encircling strap, and thence joined together utilizing a detachable linkage therefor.

All of the aforementioned Patents suffer the common deficiency of requiring an additive element, such as a leash or seat belt strap to be affixed thereto, so as to restrain the animal whilst applying restraining forces to the animal causing the four feet thereof to be lifted upwardly due to the location of the point utilized in connecting the leash or restraining strap.

SUMMARY OF THE INVENTION

A primary object of the present invention is to provide a unitary construction for an animal leash and harness assembly.

Another object of the present invention is to provide an animal restraining apparatus which applies restraining forces to an area below the frontmost portion of the neck thereof.

Still another object of the present invention is to provide a combination leash and harness which can be fastened to the animal without tightly encircling the neck portions thereof.

Yet another object of the present invention is to provide a harness assembly with an attached leash, which the animal may comfortably wear.

A further object of the present invention is to provide a combined leash and harness which may be readily fitted to animals, requiring a minimum of bending and visual communication therewith, thereby faclitating use by a blind person.

Heretofore, dog harnesses were confined within two general classes. The first class includes a dog collar, of lightweight design, worn by the animal at all times to which a leash is attached, usually at a point about the nape of the neck. This type of apparatus, though inexpensive, places a constraining force about the windpipe of the dog, when the animal is "choked" due to restricting the freedom of motion of the leash each time the animal lunges forward. The other class of apparatus includes a wide variety of harnesses, encircling various portions of the animal's body and adapted to be attached to the animal on those occasions that a leash is to be removably affixed thereto and the animal is to be restrained or guided by forces exerted on the leash. This class of apparatus utilizes a detachable leash, and more often than not applied restraining forces to the windpipe of the animal. Of maximum importance, however, are the problems concerning the difficulty encountered when applying the harness to the animal.

The present invention resides in the second class of apparatus and provides a lightweight inexpensive device which does not choke the dog and which is complete with the leash, yet is utterly simple in the attachment to the animal, when required.

These objects, as well as other objects of the present invention will become more readily apparent after reading the following description of the accompanying drawings.

DESCRIPTION OF THE PREFERRED EMBODIMENT

The structure and method of application of the present invention is applicable to an elongated strap, of the endless variety, having a portion thereof adapted to rest against the lowermost regions of a dog's foreneck. An opposed portion is formed into a loop and is utilized as the terminal end of a leash. A flexible waist encircling band is slideably affixed along its length to the opposed mid-portions of the elongated strap. The free ends of the flexible waist encircling band may be removably secured together, at a site adjacent the backbone of the animal, utilizing a belt-buckle at one free end and a plurality of holes, adapted to engage the belt-buckle. An inverted U-shaped flexible strap, designed to be supported at the nape of the neck of the animal, slideably captures portions of the foreneck grasping end of the flexible elongated band at the free ends thereof. The free ends may be bent backwards on themselves and riveted to the legs of the inverted U-shaped band, of if desired, may utilize a complementary snap-fastener set on one leg thereof so as to permit the inverted U-shaped band to be slideably attached to the elongated band with great ease. A pair of rubber-like grommets encircle the elongated band adjacent the hand grasping portion thereof, so as to create a unitary leash having a closed loop at the hand grasping end thereof. A name plate may be affixed to the inverted U-shaped band in conventional fashion.

Figure 1:
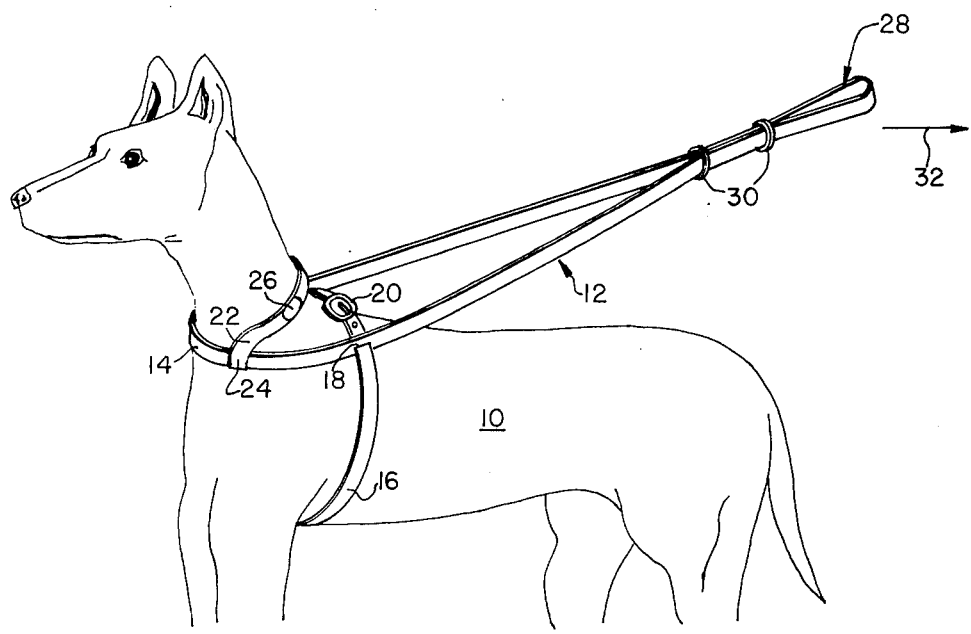
FIG. 1 is a perspective view of the present invention shown fitted to a dog.
Figure 2:
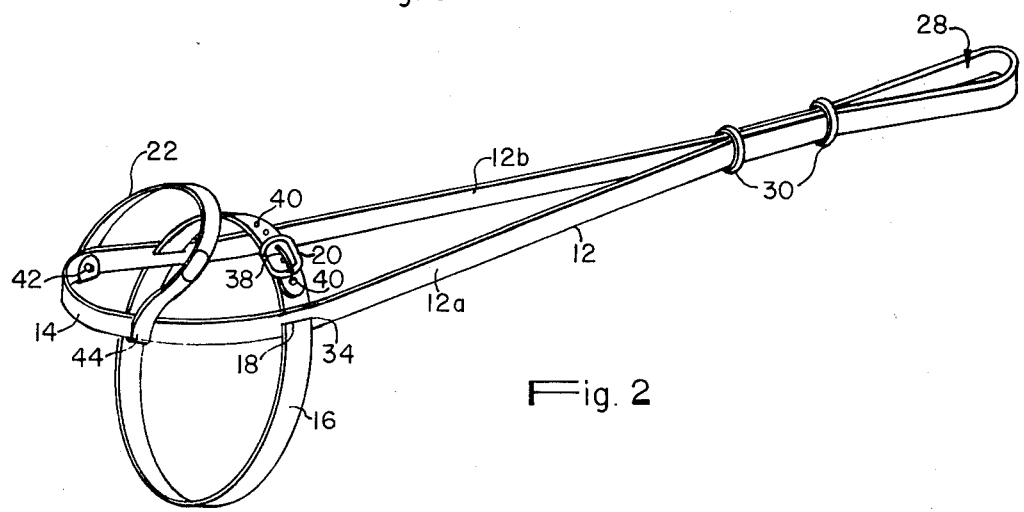
FIG. 2 is a perspective view of the present invention.

Now referring to the Figures, and more particularly to the embodiment illustrated in FIG. 2 showing a dog 10 having an elongated endless band 12 secured at point 14 to the lower foreneck portions thereof. A waist cinching band 16 is affixed to the elongated endless band 12 at point 18, and is adapted with a buckle 20. An inverted U-shaped band 22 is attached to the elongated endless band 12, adjacent point 14, at point 24, and is fitted with name plate 26. Elongated endless band 12 is adapted with a hand grasping loop 28 and a pair of rubber-like grommets 30 disposed intermediate loop 28 and point 18. Forces directed in the direction of arrow 32 are applied to the lowermost regions of the foreneck of the animal more specifically at point 14, thereby preventing "choking" of the animal.

FIG. 2 illustrates elongated endless band 12, having loop 28 at one end, point 14 at the other end, and intermediate lengths 12a and 12i b there-in-between. Rubber-like grommets 30, shown in spaced apart relationship, cause intermediate portions 12a and 12b to be clasped together. Waist cinching band 16 is slideably attached within metallic loop 34, residing at point 18, affexed to endless belt portion 12a. Another metallic loop 36, clasps a portion of waist cinching belt 16 to a portion of endless belt 12b. Buckle 20 is adapted with tongue 38, disposed selectively passing through holes 40 in one free end of waist cinching band 16. Inverted U-shaped band 22 is adapted with one free end thereof folded over on itself, so as to form an opening capturing a portion of endless belt 12 therein, and having the ends of the loop thus formed secured together utilizing rivet 42 therefor. In like fashion, the other free end of inverted U-shaped band 22 is formed into a bight slideably securing a portion of endless belt 12 in the opening thereof. The other free end, may utilize a rivet similar in function to rivet 42 to permanently close the bight or, alternatively, may utilize a snap fastener 44 therefor. Snap fastener 44 may be opened facilitating the passage of inverted U-shaped band 22 about the nape of the neck of the animal to be restrained therein, facilitating the ease in which the present invention may be quickly and easily applied to and removed from the animal.

Thus, there has been disclosed an appratus of unitary construction serving as a leash and harness assembly which may be easily and conveniently fitted and removed to and from an animal. The leash is adapted with a convenient hand grasping loop at the free end thereof which, when utilized in the process of applying restraining forces, causes the animal to be confined by an application of a rearwardly directed force to a point of the animal's body located below the throat region thereof.

One of the advantages of the present invention is a unitary construction for an animal leash and harness assembly.

Another advantage of the present invention is an animal restraining device which applies restraining forces to an area below the frontmost portion of the neck thereof.

Still another advantage of the present invention is a combination leash and harness which can be fastened to the animal without tightly encircling the neck portions thereof.

Yet another advantage of the present invention is a harness assembly with an attached leash, which the animal may comfortably wear.

A further advantage of the present invention is a combined leash and harness which may be readily fitted to animals, requiring a minimum of bending and visual communication therewith, thereby facilitating use by a blind person.

Thus, there is disclosed in the above description and in the drawings, an embodiment of the invention which fully and effectively accomplishes the objects thereof. However, it will become apparent to those skilled in the art, how to make variations and modifications to the instant invention. Therefore, this invention is to be limited, not by the specific disclosure herein, but only by the appending claims.

The embodiment of the invention in which an exclusive privilege or property is claimed are defined as follows:

1. An animal harness comprising a unitary construction, said unitary construction including an elongated endless band, means to conform the proximal end of said endless band into a closed loop, an inverted substantially U-shaped band, one end of said U-shaped band slideably affixed to and adjacent with the distal end of said endless band, the other end of said U-shaped band slideably affixed to and adjacent with said distal end of said endless band and disposed in spaced apart relationship with said one end thereof, a waist cinching band, said waist cinching band slideably affixed to two portions of said endless band intermediate said distal end and said proximal end thereof, said waist cinching band having a pair of free end portions thereof, means to adjustably secure one of said free end portions to and along the length of said waist cinching band at a point therealong located adjacent the other free end portion thereof, said endless band serving as the only means of interconnecting said U-shaped band and said waist cinching band together.

2. The animal harness as claimed in claim 1 wherein said securing means comprises a buckle and tongue assembly hingeably secured to said one end of said waist cinching band, a plurality of holes disposed in spaced apart relationship along said length.

3. The animal harness as claimed in claim 1 wherein said conforming means comprises at least one rubber-like grommet disposed about the exterior surfaces of two adjacent portions of the length of said endless band.

4. The animal harness as claimed in claim 1 further comprising said one end of said inverted U-shaped band formed into a first bight, the free end of said one end fixedly secured to a first portion of the length of said inverted U-shaped band adjacent said free end thereof, said first bight encircling a first portion of said distal end of said endless belt.

5. The animal harness as claimed in claim 1 further comprising said other end of said inverted U-shaped band formed into a second bight, the free end of said other end removably secured to a second portion of the length of said inverted U-shaped band adjacent said another free end thereof, said second bight encircling a second portion of said distal end of said endless belt.

* * * * *